Patented Mar. 17, 1925.

1,530,397

UNITED STATES PATENT OFFICE.

SVEN LUDVIG ALEXANDER ODÉN AND FRANZ SEKERA, OF STOCKHOLM, SWEDEN.

PROCESS OF PRODUCING ARTIFICIAL FERTILIZERS.

No Drawing.    Application filed April 23, 1924.  Serial No. 708,565.

*To all whom it may concern:*

Be it known that we, SVEN LUDVIG ALEXANDER ODÉN, a subject of the King of Sweden, and FRANZ SEKERA, a citizen of the State of Austria, both residing at Stockholm, in the Kingdom of Sweden, have invented certain new and useful Improvements in Processes of Producing Artificial Fertilizers, of which the following is a specification.

This invention relates to the manufacture of material for use as fertilizer, and it concerns particularly the conversion of insoluble phosphate, contained in various phosphate bearing materials, commonly used in the manufacture of fertilizer and fertilizer ingredients, such as Florida phosphate, coprolites, apatite, Nauru phosphate, etc., into compounds, in which they are available to plant life, by use of a vegetable matter containing an organic acid giving calcium salts of low solubility and an inorganic acid, the calcium salts of which have a greater solubility. While the invention contemplates the use of any vegetable matter, containing an organic acid giving calcium salts of low solubility, suitable for fertilizer purposes and any inorganic acid, we prefer to use peat and nitric acid.

With the above and other objects in view the present invention consists in the processes here below fully described.

It is well known, that by mixing and grinding crude mineral phosphate and peat the humic acids in the peat act upon tricalcium phosphate thus forming calcium humate and soluble phosphate. However this reaction takes place too slowly to be of any practical use, owing to the low concentration of the hydrogen-ions in peat. We have found that by adding only a small quantity of an inorganic acid, for instance nitric acid, to a mixture of ground crude phosphate and peat the speed of the reaction accelerates considerably. The process passes in accordance with the following equations:

1. $Ca_3(PO_4)_2 + 3 H =$

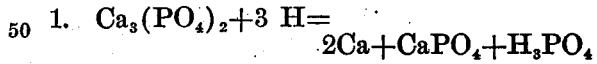
$2Ca + CaPO_4 + H_3PO_4$

The increase of the concentration of the hydrogen-ions by the addition of nitric acid increases the dissociation of the calcium-ions at the same time forming some phosphoric acid.

2. $2H_3R_{Hum} + 3 Ca = Ca_3(R_{Hum})_2 + 6 H$ where $R_{Hum}$ denotes the negative radical of humic acid.

The free calcium-ions react with the humic acids from the peat, thus forming a calcium humate of low solubility and at the same time restoring the hydrogen-ions consumed as shown in the equation 1.

3. $Ca/R_{Hum}/_2 + H_3PO_4 =$

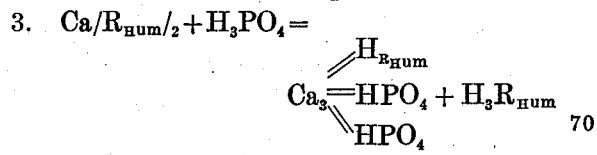

Calcium humate and phosphoric acid react thus forming a complex humo-phosphate.

This last reaction is accomplished by storing the mass under the influence of air, whereby the reaction may be accelerated by adding oxidizing catalysts such as burnt pyrites or hammer-scale or both of them to the mixture.

To the calcium humate obtained in accordance to the equation 3, the phosphoric acid probably is bound as shown in the equation 3. However it is possible that the phosphoric acid only is adsorbed by the calcium humate. In any case the investigations have shown that the phosphoric acid is easily taken up by plants.

The above specified reactions show, that the process depends on the fact, that tricalcium phosphate is more soluble than calcium humate, and that the speed of the reaction is corresponding to the concentration of hydrogen-ions.

We have found it advantageous to treat the peat with a small quantity of caustic alkali, for instance caustic soda, before the addition of the inorganic acid, in order that the humic acid easier may be precipitated when adding the acid. In order to neutralize the added acid it is advantageous to treat the mixture before the storing and aging process with alkaline earth, for instance lime. If the peat contains sufficient nitrogen, the acid mass before the aging process may be heated under such a pressure, for instance corresponding to 200° C. temperature, that the nitrogen at least partly is converted into ammonia, which thus neutralizes the surplus of acids.

In the case of such crude phosphates containing large portions of fluorine it has proved advantageous, before the grinding with peat and nitric acid, to open them up by a preliminary treatment with the quantity of sulfuric acid required to decompose the fluorides calculated as $CaF_2$.

Thus the process has to be accommodated to the quantity of fluorine in the crude phosphate, and to the amount of humic acid and nitrogen of the peat.

The process provided by the invention may be carried out, for example, conveniently as follows:

1. In case of such crude phosphates as contain large portions of fluorine opening them up by treatment with the quantity of sulphuric acid required to decompose the fluorides calculated as $CaF_2$.

2. Treating peat with a small quantity of caustic soda.

3. Grinding either crude phosphate, low in fluorine, or the mass obtained by the opening up process 1 with the mass obtained by the process 2 and a quantity of nitric acid sufficient to increase the concentration of hydrogen-ions to between pH=5.0 and pH=1.0. The grinding is advantageously executed in a Kent mill, ball-mill or Premier mill.

4. Heating the mass thus obtained under pressure to about 200° C. under heat recuperation.

5. Eventually neutralizing the mass thus obtained with lime.

6. Mixing the mass from 5 with a mixture of burnt pyrites and hammer-scale and storing the thus obtained mass under the influence of air.

7. Drying and grinding the thus-obtained mass.

Having thus described our invention, what we claim as new, and desire to secure by Letters Patent, is—

1. The process of producing an artificial fertilizer consisting of grinding crude mineral phosphate and a vegetable matter containing an organic acid giving calcium salts of low solubility with an inorganic acid in a quantity sufficient to increase the concentration of the hydrogen-ions in the mass and afterwards permitting the mass to age under the influence of air.

2. The process of producing an artificial fertilizer consisting of grinding crude mineral phosphate and peat with an inorganic acid in a quantity to increase the concentration of the hydrogen-ions in the mass and afterwards permitting the mass to age under the influence of air.

3. The process of producing an artificial fertilizer consisting of grinding crude mineral phosphate and a vegetable matter containing an organic acid giving calcium salts of low solubility with nitric acid in a quantity sufficient to increase the concentration of the hydrogen-ions in the mass and afterwards permitting the mass to age under the influence of air.

4. The process of producing an artificial fertilizer consisting of grinding crude mineral phosphate and peat with nitric acid in a quantity sufficient to increase the concentration of the hydrogen-ions in the mass and afterwards permitting the mass to age under the influence of air.

5. The process of producing an artificial fertilizer consisting of treating an organic matter containing an organic acid giving calcium salts of low solubility with a small quantity of an alkali, grinding the mass thus obtained and crude mineral phosphate with an inorganic acid in a quantity sufficient to increase the concentration of hydrogen-ions in the mass and afterwards permitting the mass to age under the influence of air.

6. The process of producing an artificial fertilizer consisting of treating peat with a small quantity of an alkali, grinding the mass thus obtained and crude mineral phosphate with an inorganic acid in a quantity sufficient to increase the concentration of hydrogen-ions in the mass and afterwards permitting the mass to age under the influence of air.

7. The process of producing an artificial fertilizer consisting of treating peat with a small quantity of caustic soda, grinding the mass thus obtained and crude mineral phosphate with nitric acid in a quantity sufficient to increase the concentration of hydrogen-ions in the mass and afterwards permitting the mass to age under the influence of air.

8. The process of producing an artificial fertilizer consisting of treating crude phosphate containing large portions of fluorine with the quantity of sulfuric acid required to decompose the fluorides calculated as $CaF_2$, and grinding the mass thus obtained and a vegetable matter containing an organic acid giving calcium salts of low solubility with an inorganic acid in a quantity sufficient to increase the concentration of the hydrogen-ions in the mass and afterwards permitting the mass to age under the influence of air.

9. The process of producing an artificial fertilizer consisting of treating crude phosphate containing large portions of fluorine with the quantity of sulfuric acid required to decompose the flourides calculated as $CaF_2$ and grinding the mass thus obtained with peat and nitric acid in a quantity sufficient to increase the concentration of the hydrogen-ions in the mass and afterwards permitting the mass to age under the influence of air.

10. The process of producing an artificial fertilizer consisting of treating crude phosphate containing large portions of fluorine with the quantity of sulfuric acid required to decompose the fluorides calculated as $CaF_2$, and grinding the mass thus obtained and the mass, obtained by treating a vegetable matter containing an organic acid giving calcium salts of low solubility with a small quantity of an alkali, with an inorganic acid in a quantity sufficient to increase the concentration of hydrogen-ions in the mass and afterwards permitting the mass to age under the influence of air.

11. The process of producing an artificial fertilizer consisting of treating crude phosphate containing large portions of fluorine with the quantity of sulfuric acid required to decompose the fluorides calculated as $CaF_2$, and grinding the mass thus obtained and the mass, obtained by treating peat with a small quantity of caustic soda, with nitric acid in a quantity sufficient to increase the concentration of hydrogen-ions in the mass and afterwards permitting the mass to age under the influence of air.

12. The process of producing an artificial fertilizer consisting of grinding crude mineral phosphate and a vegetable matter containing an organic acid giving calcium salts of low solubility with an inorganic acid in a quantity sufficient to increase the concentration of the hydrogen-ions in the mass, neutralizing the surplus of acids with alkaline earth, and afterwards permitting the mass to age under the influence of air.

13. The process of producing an artificial fertilizer consisting of grinding crude mineral phosphate and peat with nitric acid in a quantity sufficient to increase the concentration of the hydrogen-ions in the mass, neutralizing the surplus of acids with lime and afterwards permitting the mass to age under the influence of air.

14. The process of producing an artificial fertilizer consisting of grinding crude mineral phosphate and vegetable matter containing an organic acid giving calcium salts of low solubility with an inorganic acid in a quantity sufficient to increase the concentration of the hydrogen-ions in the mass, heating the mass thus obtained under such a pressure that the nitrogen in the organic matter is at least partly converted into ammonia, and afterwards permitting the mass to age under the influence of air.

15. The process of producing an artificial fertilizer consisting of grinding crude mineral phosphate and peat with nitric acid in a quantity sufficient to increase the concentration of the hydrogen-ions in the mass, heating the mass thus obtained under such a pressure that the nitrogen in the peat is at least partly converted into ammonia, and afterwards permitting the mass to age under the influence of air.

16. The process of producing an artificial fertilizer consisting of grinding crude mineral phosphate and a vegetable matter containing an organic acid giving calcium salts of low solubility with an inorganic acid in a quantity sufficient to increase the concentration of the hydrogen-ions in the mass, heating the mass thus obtained under pressure up to 200° C., and afterwards permitting the mass to age under the influence of air.

17. The process of producing an artificial fertilizer consisting of grinding crude mineral phosphate and peat with nitric acid in a quantity sufficient to increase the concentration of the hydrogen-ions in the mass, heating the mass thus obtained under pressure up to 200° C., and afterwards permitting the mass to age under the influence of air.

18. The process of producing an artificial fertilizer consisting of grinding crude mineral phosphate and a vegetable matter containing an organic acid giving calcium salts of low solubility with an inorganic acid in a quantity sufficient to increase the concentration of hydrogen-ions in the mass, heating the mass under such a pressure, that the nitrogen in the organic matter at least partly converts into ammonia, neutralizing the surplus of acids in the mass thus obtained with an alkaline earth and afterwards permitting the mass to age under the influence of air.

19. The process of producing an artificial fertilizer consisting of grinding crude mineral phosphate and a vegetable matter containing an organic acid giving calcium salts of low solubility with an inorganic acid in a quantity sufficient to increase the concentration of hydrogen-ions in the mass, heating the mass, under such a pressure that the nitrogen in the organic matter is at least partially converted into ammonia, neutralizing the surplus of acids in the mass thus obtained with lime and afterwards permitting the mass to age under the influence of air.

20. The process of producing an artificial fertilizer consisting of grinding crude mineral phosphate and peat with nitric acid in a quantity sufficient to increase the concentration of hydrogen-ions in the mass, heating the mass under such a pressure that the nitrogen in the peat is converted into ammonia, neutralizing the surplus of acids in the mass thus obtained with lime, and afterwards permitting the mass to age under the influence of air.

21. The process of producing an artificial fertilizer consisting of grinding crude mineral phosphate and a vegetable matter containing an organic acid giving calcium salts of low solubility with an inorganic acid in a quantity sufficient to increase the concentration of the hydrogen-ions in the mass, adding oxidizing catalysts to the mass, and afterwards permitting the mass to age under the influence of air.

22. The process of producing an artificial fertilizer consisting of grinding crude mineral phosphate and a vegetable matter containing an organic acid giving calcium salts of low solubility with an inorganic acid in a quantity sufficient to increase the concentration of the hydrogen-ions in the mass, adding a mixture of burnt pyrites and hammer-scale to the mass, and afterwards permitting the mass to age under the influence of air.

23. The process of producing an artificial fertilizer consisting of grinding crude mineral phosphate and peat with nitric acid in a quantity sufficient to increase the concentration of the hydrogen-ions in the mass, adding a mixture of burnt pyrites and hammer-scale to the mass, and afterwards permitting the mass to age under the influence of air.

24. The process of producing an artificial fertilizer consisting of grinding crude mineral phosphate and a vegetable matter containing an organic acid giving calcium salts of low solubility with an inorganic acid in a quantity sufficient to increase the concentration of the hydrogen-ions in the mass, permitting the mass to age under the influence of air, drying and grinding the thus obtained mass.

25. The process of producing an artificial fertilizer consisting of grinding crude mineral phosphate and peat with nitric acid in a quantity sufficient to increase the concentration of the hydrogen-ions in the mass, permitting the mass to age under the influence of air, drying and grinding the thus obtained mass.

26. The process of producing an artificial fertilizer consisting of treating peat with caustic soda, grinding the mass thus obtained and crude mineral phosphate with nitric acid in a quantity sufficient to increase the concentration of hydrogen-ions in the mass, neutralizing the surplus of acids with lime, adding a mixture of burnt pyrites and hammer-scale to the mass, and after storing under the influence of air, drying and grinding the mass.

27. The process of producing an artificial fertilizer consisting of grinding crude mineral phosphate and peat with nitric acid in a quantity sufficient to increase the concentration of hydrogen-ions, heating the mass under pressure to 200° C., neutralizing the mass with lime, adding a mixture of burnt pyrites and hammer-scale to the mass and after storing under the influence of air drying and grinding the mass.

28. The process of producing an artificial fertilizer consisting of treating crude mineral phosphate containing large portions of fluorine with the quantity of sulfuric acid required to decompose the fluorides calculated as $CaF_2$, and grinding the mass thus obtained and peat, treated with a small quantity of caustic soda, together with nitric acid in a quantity sufficient to increase concentration of hydrogen-ions in the mass, heating the mass under such a pressure that the nitrogen in the peat converts into ammonia, neutralizing the surplus of acids in the mass thus obtained with lime, adding to the thus obtained mass a mixture of burnt pyrites and hammer-scale, and after storing under the influence of air drying and grinding the mass.

In testimony whereof we affix our signatures.

SVEN LUDVIG ALEXANDER ODÉN.
FRANZ SEKERA.

Witnesses:
SIGURD NORELEIN.
L. BERG VON LINDE.